United States Patent Office 2,717,249
Patented Sept. 6, 1955

2,717,249

METHOD OF MAKING PYROPHOSPHORTETRA-AMIDES OF SECONDARY ALIPHATIC AMINES

Arthur D. F. Toy, Park Forest, and James R. Costello, Jr., Chicago Heights, Ill., assignors to Victor Chemical Works, a corporation of Illinois No Drawing. Application July 28, 1950, Serial No. 176,526

9 Claims. (Cl. 260—247.5)

This invention relates to a process of preparing symmetrical pyrophosphortetraamides of secondary aliphatic amines by the reaction of an aliphatic secondary diamido phosphoryl chloride with water and a strong base.

The equation for this reaction may be represented as follows:

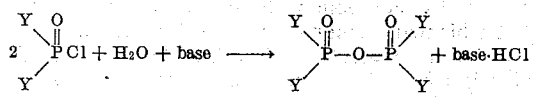

reaction product in which Y represents a secondary amido group chosen from the group consisting of dialkyl and heterocyclic amido groups.

Examples of diamido phosphoryl chlorides which may be used in our invention are bis(dimethylamido) phosphoryl chloride, bis(diethylamido) phosphoryl chloride, bis(dipropylamido)phosphoryl chloride, bis(dibutylamido)phosphoryl chloride, dipiperidino phosphoryl chloride, dimorpholido phosphoryl chloride, and the like.

In A. D. F. Toy application Number 151,531, filed March 23, 1950, there is disclosed and claimed the carrying out of such a reaction in the presence of pyridine or the like. The reaction with pyridine, however, is very much poorer than the reaction here claimed. As shown in said application, a yield of 46.3% was typical for a reaction with pyridine whereas with the substances here claimed yields in excess of 80% were typical. The improved results are obtained with strong bases such as trialkyl amine such for example as triethylamine. Similarly tertiary aralkyl amines such as tribenzyl and dimethyl benzyl may be employed. Trimethyl amine has an ionization constant of $7.4 \times 10^{-5}$ and triethyl amine $6.4 \times 10^{-4}$ and dimethyl benzylamine $1.05 \times 10^{-5}$. We prefer to use amines having an ionization constant not substantially less than $1.0 \times 10^{-5}$.

The reaction is preferably carried out at 20° C. or above. Below 20° C. the reaction proceeds but slowly. At least theoretical amounts of base and water should be used as less than these amounts will reduce the yields correspondingly. It is generally preferred to add a mixture of a base and water simultaneously to the secondary amido phosphoryl chloride, though satisfactory results may be obtained by adding the water and base separately. If the reaction is properly controlled, the results obtained by this procedure are essentially the same as by the other procedures. The stoichiometric amount of water required for this reaction is added to the reaction mixture. Greater amounts of water do not appear to be detrimental to the reaction; hence additional water may be used at any time before or during the reaction.

The reaction generally proceeds most satisfactorily at temperatures of about 40° to 80° C., but the process may be carried on at higher temperatures. At temperatures above 100° C. the reaction should be carried out under pressure to prevent evaporation of the water. When normally gaseous amines are used as the base, for example trimethylamine, reaction under pressure, or at least in an enclosed container, is desirable to prevent escape of the gaseous amine.

The general procedure followed is to add to the diamido phosphoryl chloride, either separately or together, a base and water, permitting the ingredients to react at above 20° C. for several hours, and preferably at 40° to 80° C. When the amido phosphoryl chloride reactant is a solid, it is desirable to dissolve it in an organic solvent, thereby increasing the rate of reaction and ultimate yield. Liquid amido phosphoryl chloride reactants are generally reacted with water and a base in the absence of an organic solvent. Though a solvent may be used, we have found that it generally does not aid the reaction if the amido phosphoryl chloride compound is a liquid. In either case, upon completion of the reaction the pyrophosphortetraamide product is separated from the solid salt formed during the reaction. This may be accomplished in cases where the product is not water soluble by washing with water, whereby the salts are dissolved, leaving a fairly pure water-insoluble residue as the product. Otherwise the product is separated from the salt by adding a solvent in which the pyrophosphortetraamide is selectively soluble. The salt may be removed by filtering or centrifuging and the product subsequently recovered from the filtrate (which consists of the pyrophosphortetraamide dissolved in a solvent) by distilling off the solvent. Suitable solvents for this purpose are carbon tetrachloride, ether, benzene and the like.

Octamethyl pyrophosphoramide obtained by reacting bis(dimethylamido)phosphoryl chloride with water in the presence of a suitable base is a water soluble liquid which is used as a systemic poison. The compound is absorbed by the plant through its leaves and roots, and renders the entire plant toxic to sucking insects. It is not necessary to purify the compound by distillation for this use as the crude product as obtained in this process makes a good insecticide.

*Example 1*

To 94.5 g. (0.554 mol) bis(dimethylamido)phosphoryl chloride there was added 10 g. (0.55 mol., 100% excess) water. The temperature rose to 39° C. Then 56.5 g. (0.559 mol, 1% excess) of triethylamine was added in two minutes. The temperature was maintained between 40° to 45° C. for two hours. Then 100 ml. carbon tetrachloride was added and the slurry stirred for one hour. It was filtered to remove the solid amine hydrochloride salt. The carbon tetrachloride was removed by distillation. The liquid residue, octamethyl pyrophosphoramide, weighed 73.2 g. representing a 92.5% yield, with a refractive index of 1.4620 at 25° C. Upon distillation the crude liquid yielded 84% of substantially pure product which analyzed 21.3% P and 19.4% N as compared to the calculated values of 21.6% P and 19.6% N.

*Example 2*

In another example similar to Example 1, 5% excess amine was used together with 100% excess water. The reaction was carried out at 65° to 70° C. A crude yield of 91.6% product was obtained. Upon distillation 86% of the crude product was recovered as substantially pure octamethyl pyrophosphoramide.

*Example 3*

In another example similar to Example 1 but using only the theoretical amount of water, with the amine being used in 5% excess, the product yield was reduced to approximately 63%. Using 50% excess water with the other conditions being the same increased the product yield to 95%.

*Example 4*

To 134.1 g. (0.786 mol) bis(dimethylamido)phosphoryl chloride was added 14.2 g. (0.786 mol) water and 94.6 g. (0.825 mol) N-ethyl morpholine. The temperature was maintained at 40° to 44° C. for 1½ hours, and then cooled to 30° C. and maintained there an additional half hour. 100 ml. carbon tetrachloride was added and the slurry was filtered. The filtrate was heated to distill off carbon tetrachloride, leaving a crude liquid residue containing mainly octamethyl pyrophosphoramide. The crude residue weighed 85.8 g. (83% yield).

*Example 5*

To 84.6 g. (0.374 mol) bis(diethylamido)phosphoryl chloride was added 6.7 g. (0.382 mol) water and 39.6 g. (0.392 mol, 5% excess) triethylamine. The mixture was gradually heated to 70° C. and maintained at that temperature for several hours. It was then cooled and 100 ml. carbon tetrachloride added, stirred and filtered. The solvent was removed by distillation. The liquid residue, octaethyl pyrophosphoramide, weighed 72 g., equivalent to a 97% yield. 87% of the liquid residue distilled at 95° to 110° C. at less than 1 mm. The distilled product had a refractive index of 1.4668 at 25° C.

*Example 6*

To 47.6 g. (0.16 mol) bis(di-n-propylamido)phosphoryl chloride was added 3.0 g. (0.16 mol) water and 17.8 g. (0.176 mol) triethylamine. There was a rapid reaction, the temperature quickly rising to 40° C. A viscous, heavy precipitate was formed in about half an hour. 100 ml. carbon tetrachloride was added to dissolve the product and act as a diluent for the heavy amine hydrochloride precipitate. After stirring for about an hour, the slurry was filtered. The filter cake was dissolved in water and the solution extracted with carbon tetrachloride. The extract solution was added to the original filtrate. The carbon tetrachloride was removed by distillation. The liquid residue of octa-n-propyl pyrophosphoramide weighed 24.6 g.

*Example 7*

To 79.4 g. (0.32 mol) dipiperidino phosphoryl chloride there was added 5.7 g. (0.316 mol) water and 33.5 g. (0.332 mol) triethylamine. A white solid was formed in quantity. The mixture was heated to 40° C. for one hour, cooled, and 100 ml. carbon tetrachloride added and stirred for an additional hour. The slurry was filtered; carbon tetrachloride was removed by distillation. The residual semi-solid tetrapiperidino pyrophosphoramide, weighed 59.7 g. (84.7% yield).

*Example 8*

To 103.9 g. (0.41 mol) of dimorpholido phosphoryl chloride dissolved in 100 ml. chloroform there was added 7.4 g. (0.41 mol) water and 43.4 g. (0.426 mol) of triethylamine. The reactants were heated to 70° C. to initiate the reaction. At between 70° to 75° C. the reaction proceeded rapidly, the amine hydrochloride precipitating out. Heating was continued at 70° to 75° C. for one hour. Then the slurry was cooled and filtered. The amine hydrochloride filter cake was washed, first with chloroform and then carbon tetrachloride. The solvents were removed from the combined filtrates by distillation at 60° C. up to 15 mm. pressure. The residue, a solid brown substance, weighed 89 g. (96% yield). The analysis showed the compound to be essentially all tetramorpholido pyrophosphoramide. The product analyzed 13.2% P and 12.2% N, as compared to the calculated values of 13.6% P and 12.3% N.

The foregoing detailed description is given for clearness of understanding only and no unnecessary limitations should be understood therefrom as modifications will be obvious to those skilled in the art.

We claim:

1. The method of making a pyrophosphortetraamide of a secondary aliphatic amine comprising reacting a member of the class consisting of bis(dialkylamido) phosphoryl chlorides, dipiperidino phosphoryl chloride and dimorpholido phosphoryl chloride with water and triethylamine and separating the resulting pyrophosphortetraamide.

2. The method of claim 1 wherein said reaction is carried out at a temperature of at least 20° C.

3. The method of making a symmetrical pyrophosphortetraamide of a secondary aliphatic amine comprising mixing a member of the class consisting of bis(dialkylamido) phosphoryl chlorides, dipiperidino phosphoryl chloride and dimorpholido phosphoryl chloride with at least stoichiometric amounts of water and triethylamine maintaining a temperature of at least 20° C. until the reaction is substantially complete, and separating the resulting pyrophosphortetraamide.

4. The method of claim 3 wherein said temperature is maintained between about 40° and 80° C.

5. The method of claim 3 wherein said phosphoryl chloride is a bis(dialkylamido)phosphoryl chloride.

6. The method of claim 3 wherein said phosphoryl chloride is bis(dimethylamido)phosphoryl chloride.

7. The method of claim 3 wherein said phosphoryl chloride is dimorpholido phosphoryl chloride.

8. The method of claim 3 wherein said phosphoryl chloride is dipiperidino phosphoryl chloride.

9. The method of claim 3 wherein said amide product is separated by selectively dissolving said product in an organic solvent, filtering and evaporating the solvent.

References Cited in the file of this patent

UNITED STATES PATENTS

| | | |
|---|---|---|
| 2,502,966 | Kosolapoff | Apr. 4, 1950 |
| 2,671,109 | Hartley | Mar. 2, 1954 |

OTHER REFERENCES

Australian patent application 23752/48, open for public inspection, November 18, 1948, Abstract published January 5, 1949.

Atherton et al., J. Chem. Soc. (London) 1945, pp. 382–5.

Atherton et al., J. Chem. Soc. (London) 1947, pp. 624–8.

Atherton et al., J. Chem. Soc. (London) 1948, pp. 1108.

Atherton et al., J. Chem. Soc. (London) 1949, pp. 2921–22.

Ziele et al., Ber. der Deu. Chem., vol. 75 (1942), pp. 1127–33.

Palit, Jour. India Chem. Soc., vol. 25(3), 1948, pp. 127–38.